US009282506B2

(12) United States Patent
Berggren

(10) Patent No.: US 9,282,506 B2
(45) Date of Patent: Mar. 8, 2016

(54) CELL SEARCH IN WIRELESS COMMUNICATION SYSTEM

(71) Applicant: Huawei Technologies Co., Ltd., Shenzhen (CN)

(72) Inventor: Fredrik Berggren, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 90 days.

(21) Appl. No.: 14/152,602

(22) Filed: Jan. 10, 2014

(65) Prior Publication Data
US 2014/0126568 A1 May 8, 2014

Related U.S. Application Data

(63) Continuation of application No. PCT/CN2011/077021, filed on Jul. 11, 2011.

(51) Int. Cl.
| H04J 3/06 | (2006.01) |
| H04W 48/16 | (2009.01) |
| H04J 11/00 | (2006.01) |
| H04W 56/00 | (2009.01) |
| H04L 5/00 | (2006.01) |
| H04L 25/02 | (2006.01) |
| H04L 27/26 | (2006.01) |

(52) U.S. Cl.
CPC ........... *H04W 48/16* (2013.01); *H04J 11/0069* (2013.01); *H04L 5/0053* (2013.01); *H04L 5/0094* (2013.01); *H04L 27/2662* (2013.01); *H04W 56/001* (2013.01); *H04W 56/0015* (2013.01); *H04W 56/0055* (2013.01); *H04L 5/001* (2013.01); *H04L 25/0216* (2013.01); *H04L 27/2607* (2013.01); *H04L 27/2656* (2013.01)

(58) Field of Classification Search
None
See application file for complete search history.

(56) References Cited

U.S. PATENT DOCUMENTS

| 2007/0091785 A1 | 4/2007 | Lindoff et al. |
| 2009/0316659 A1 | 12/2009 | Lindoff et al. |
| 2011/0249577 A1* | 10/2011 | Chin et al. .................. 370/252 |
| 2012/0099565 A1 | 4/2012 | Kim et al. |

FOREIGN PATENT DOCUMENTS

| EP | 2315473 A1 | 4/2011 |
| WO | 2009153165 A1 | 12/2009 |
| WO | 2010147444 A2 | 12/2010 |

OTHER PUBLICATIONS

Extended European Search Report, Application No. 11867550.3, Applicant: Huawei Technologies Co., Ltd., Apr. 7, 2014, 13 pages.

(Continued)

*Primary Examiner* — Afshawn Towfighi
(74) *Attorney, Agent, or Firm* — Slater & Matsil, L.L.P.

(57) ABSTRACT

A receiver performs synchronization to a secondary component carrier in a wireless communication system. The secondary component carrier is aggregated with a primary component carrier in the wireless communication system. Side information of the secondary component carrier is utilized to reduce occurrences of a number of synchronization hypotheses in a hypothesis test in the case that synchronization to the secondary component carrier is performed. Symbol timing synchronization of the secondary component carrier is determined in accordance with the reduced occurrences of the number of synchronization hypotheses.

16 Claims, 3 Drawing Sheets

(56) References Cited

OTHER PUBLICATIONS

"Reply to LS on DL timing difference and DL timing reference in Carrier Aggregation," 3GPP TSG-RAN WG4 Ad hoc meeting #10-03, R4-102579, Source RAN4, Bratislava, Slovakia, Jun. 28-Jul. 2, 2010, 2 pages.

"3rd Generation Partnership Project; Technical Specification Group Radio Access Network; Evolved Universal Terrestrial Radio Access (E-UTRA); Carrier Aggregation; Base Station (BS) radio transmission and reception (Release 10)," 3GPP TR 36.808 V1.0.0, Technical Report, Dec. 2010, 103 pages.

"LS on UE receiver window for Inter-band non-contiguous CA," 3GPP TSG RAN WG1 Meeting #65, R1-111779, LTE_CA-Core, Spain, Barcelona, May 9-13, 2011, 4 pages.

International Search Report and Writtien Opinion of Patent Cooperation Treaty (PCT), International Application No. PCT/CN2011/077021, Applicant Huawei Technologies Co., Ltd., et al., date of mailing Apr. 19, 2012, 11 pages.

Ericsson, St-Ericsson, "Remaining Details for CA-based HetNets," 3GPP TSG RAN WG1 Meeting #63bis, R1-110031, Dublin, Ireland, Jan. 17-21, 2011, 3 pages.

Huawei, Hisilicon, "Discussion on CA-based HetNet," 3GPP TSG RAN WG1 Meeting #65, R1-111381, Discussion and Decision, Barcelona, Spain, May 9-132, 2011, 3 pages.

\* cited by examiner

CELL SEARCH IN WIRELESS COMMUNICATION SYSTEM

This application is a continuation of International Application No. PCT/CN2011/077021, filed on Jul. 11, 2011, which is hereby incorporated by reference in its entirety.

TECHNICAL FIELD

The present disclosure relates to wireless communication technology and particularly to cell search in a wireless communication system.

BACKGROUND

A fundamental acquisition procedure in a cellular wireless system is cell search, which is performed by a terminal for obtaining time synchronization and frequency synchronization to a cell in the network and detecting cell identity of the cell. More precisely, there are two kinds of cell search: initial cell search and neighbor cell search. Initial cell search is performed when the terminal is powered on and comprises obtaining synchronization, cell identification, and receiving of a broadcast channel containing necessary system information for the terminal to access the cell. Neighbor cell search is performed by the terminal once it is connected to the network in search for candidate cells for handover. Hence, it typically does not involve reception of a broadcast channel. Rather once a cell has been detected, the terminal may feedback measurements of the cell to the base station, as to aid handover decisions. In practice, neighbor cell search occurs much more frequently than initial cell search. Cell search is enabled by the reception of synchronization channels transmitted from a base station.

The above procedures are incorporated in a 3GPP LTE system, wherein a mobile terminal (i.e., a UE) receives and transmits data on one cell at a time. However, in LTE-HW Advanced so called carrier aggregation is introduced, for which the UE is able to simultaneously receive (or transmit) data on multiple downlink (or uplink) carriers. In this way, higher data rates can be achieved. According to the LTE-Advanced standard, a Primary cell (PCell) and a Secondary cell (SCell) are defined. In the downlink, the carrier corresponding to the PCell is the Downlink Primary Component Carrier (DL PCC), while in the uplink it is the Uplink Primary Component Carrier (UL PCC). Secondary Cells (SCells) can be configured to form together with the PCell a set of serving cells. In the downlink, the carrier corresponding to a SCell is a Downlink Secondary Component Carrier (DL SCC) while in the uplink it is an Uplink Secondary Component Carrier (UL SCC). The notion of cell is not necessarily related to a geographical area. Rather, it is a logical description and several cells can be transmitted from the same physical location and base station (eNodeB). The number of serving cells that can be configured depends on the aggregation capability of the UE. When adding a new SCell, dedicated RRC signaling is used for sending all required system information of the SCell, i.e., while in connected mode, UEs need not acquire broadcast system information directly from the SCells.

A configured cell may be activated or deactivated. Typically, the UE maintains communication over its PCell and when the need for higher data rates occurs, the eNodeB may activate one or several configured SCells to establish more bandwidth resources in addition to the PCell. Once the UE has no need for high data rates, the eNodeB could deactivate one or several of its SCells, in order to reduce the power consumption in the UE. When a SCell is configured, the eNodeB sends related information concerning the SCell to the UE on channels of the PCell. Such information includes the carrier frequency of the SCell and its cell identity. In order for the UE to start receiving and transmitting on the SCell, synchronization to the DL SCC of the SCell still needs to be acquired.

Cell search is regarded as a procedure demanding much complexity and power in the UE, since finding synchronization requires correlators (i.e., matched filters) performing complex valued multiplications (due to matching the received signal to a replica signal). It is therefore important to have low-complex receiver implementations of the cell searcher. It should also function at very low Signal-to-Interference-plus-Noise-Ratio (SINR) which may necessitate accumulation of correlation values over many radio frames. Low SINRs may not only be the case at distances far from the transmitter. High interference situations may also be common in heterogeneous network deployments, i.e., when small low-power cells (pico cells, femto cells, Home eNodeBs etc.) are deployed at the same carrier frequency as a high-power macro cell and in its coverage region. In that case, a UE that is connected to a pico cell may, even though the path loss is smaller to the pico cell than the macro cell, experience large interference from the macro cell, due to its higher transmit power. The UE may therefore not necessarily be connected to the cell with the largest received power. This implies that the SINRs could be far less than 0 dB. These severe situations could be handled for the data channels by coordinated scheduling between the macro and pico cell. However, there are no means for interference coordination of the synchronization channels, which makes synchronization a problem.

SUMMARY OF THE INVENTION

An aspect of the present disclosure is to provide a method of facilitating cell search in wireless communication system.

Another aspect of the present disclosure is to provide a receiver and an apparatus capable of facilitated cell search in wireless communication system.

Another aspect of the present disclosure is to provide a computer program of cell search in wireless communication system. The computer program comprises code means, which when run in a computer causes the computer to execute the method described above.

Another aspect of the present disclosure is to provide a computer program product of cell search in wireless communication system. The computer program product comprises a computer readable medium and a computer program described above, wherein said computer program is included in the computer readable medium.

DETAILED DESCRIPTION OF ILLUSTRATIVE EMBODIMENTS

Figure 1:
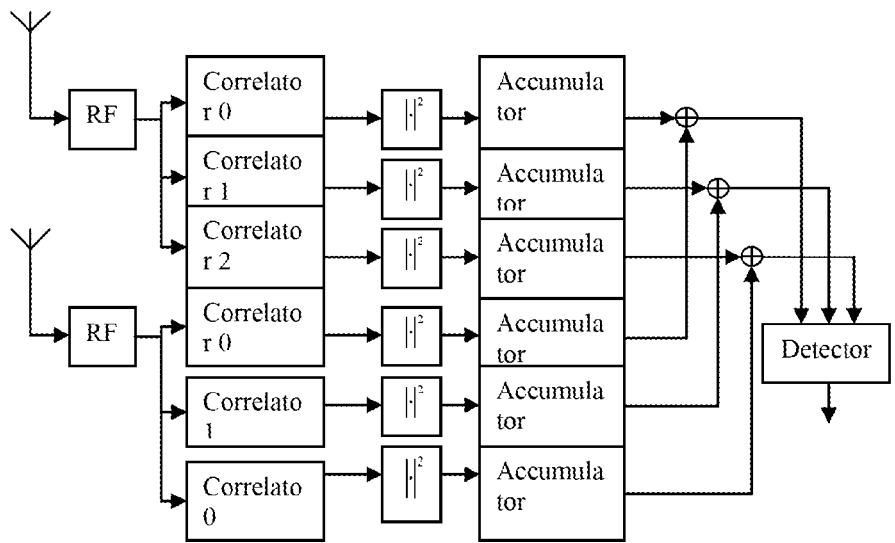
FIG. 1 shows an example of a receiver for the PSS.

In this disclosure, we discuss methods for synchronization of the SCells in a carrier aggregation system.

For carrier aggregation, synchronization needs to be established on all serving cells. It is a problem is to obtain the synchronization of a SCell that has been configured as a serving cell, since the SINR on its synchronization channel may be very low.

It is an aim of this disclosure to provide a cell search procedure for carrier aggregation which facilitates detection (a) at low SINRs, (b) with low computational burden, (c) with low implementation complexity, and (d) with low power consumption.

In LTE/LTE-Advanced, a radio frame is 10 ms which is further divided into 10 subframes of length 1 ms and each subframe comprises 2 slots of 0.5 ms. (3GPP TR 36.808 V1.0.0 (2010-12) Evolved Universal Terrestrial Radio Access (E-UTRA); Carrier Aggregation; Base Station (BS) radio transmission and reception, which is incorporated herein by reference.) Either a normal cyclic prefix length is configured, for which a slot comprises 7 OFDM symbols, or an extended cyclic prefix is configured, for which a slot comprises 6 OFDM symbols. Two synchronization signals are defined; the Primary Synchronization Signal (PSS) and the Secondary Synchronization Signal. Note here that the term primary and secondary does not refer to whether a cell is configured as PCell or SCell. Any configured cell can be assumed to contain one PSS and one SSS.

For FDD, the PSS is contained in the last OFDM symbol of slot 0 and slot 10. The SSS is contained in the OFDM symbol preceding the PSS. For TDD, the PSS is contained in the third OFDM symbol in slot 2 and slot 12, while the SSS is contained in 3 OFDM symbols earlier. The same PSS is transmitted in the 2 OFDM symbols in a radio frame. Since the time separation between the 2 PSSs is 5 ms, once the PSS has been detected, the 5 ms timing is known as well as its OFDM symbol timing. The OFDM symbol timing is performed at sample resolution, determined by the sampling rate in the receiver. To obtain the 10 ms radio frame timing, 2 different SSSs are transmitted in 2 OFDM symbols in a radio frame. Thus, once one SSS has been detected, the 10 ms radio frame timing is known. The absolute time separation between the PSS and the SSS depends on the configured cyclic prefix length. Once the PSS has been detected, the UE may perform blind detection of the SSS under two different cyclic prefix length hypotheses, thereby also detecting the cyclic prefix length.

The PSS consists of a complex-valued punctured Zadoff-Chu sequence in the frequency domain. The time-domain signal is obtained by an IFFT of the sequence. There are 3 such sequences and the UE blindly searches in the time-domain, typically by matched filtering, which of the 3 PSS was sent and the correct timing thereof. The sequences were particularly designed and mapped to the subcarriers such that the PSS has time-domain symmetry, which allows matched filters with reduced number of complex multiplications by approximately half. Two of the PSSs are also complex-conjugate versions of each other, which means that both of them could be detected with the complexity of just one matched filter. In the PSS detection, frequency offsets may also be estimated, which are due to inaccuracies of the local oscillator in the UE. The frequency offsets are typically only an issue in the initial cell search, while they are much smaller when the UE is doing neighbor cell search.

A principal detector of the PSS is contained in FIG. 1 for a receiver with two receiver antennas. The output from the RF part is a sampled base-band signal. Three correlators (i.e., matched filters) are applied to the received signal and their respective output is squared (i.e., a 2-norm) to obtain the energy in each output sample. It is noted that any other norm may be applicable, e.g., the 1-norm just resulting in the absolute value. For each output sample, the energy is accumulated from one or several periods of at least 5 ms. A detector determines which of the 3 PSS was transmitted and the correct sample for the start of the OFDM symbol comprising the PSS. Typically the detector sets a threshold to avoid false alarms and a PSS is detected only when its energy is above the threshold. Comparison with the threshold could be executed either continuously for each processed sample, or once the receiver has processed sufficient amount of samples to assure that it has received a PSS, i.e., corresponding to 5 ms in the LTE system. Accumulation of correlation values may proceed until the PSS can be reliably detected. Under ideal conditions, the output from the correlator will result in a value comprising the whole energy of the PSS at the first sample of the OFDM symbol containing the PSS. The output from the PSS detection is a time sample and the corresponding PSS sequence index. FIG. 1 shows the functional behavior only which may differ from the actual implementation. For example, due to the complex conjugate symmetry between two of the PSSs, two of the correlators may be jointly implemented.

The SSS consists of two real-valued scrambled m-sequences of length 31, mapped to the subcarriers in the frequency domain. The two sequences are interleaved every other subcarrier. The number of m-sequences is 31. The SSS is transmitted two times per radio frame. The two SSSs are different in order to encode the radio frame timing. However, the same two sequences are transmitted in the two SSSs and they are distinguished by using different mappings of the sequences to the subcarriers in the different SSSs. The two sequences mutually swap the set of subcarriers used in the two SSS. In each SSS, there are 168 allowed combinations of the two scrambled m-sequences. The SSS is designed for detection in the frequency-domain, since the m-sequences allow implementations of correlators by Fast Hadamard Transforms. Since the PSS and the SSS are located closely in time and are transmitted on the same subcarriers, the PSS could be used as a reference signal in the SSS detection, thereby providing channel estimates such that the SSS can be coherently detected.

Figure 2:
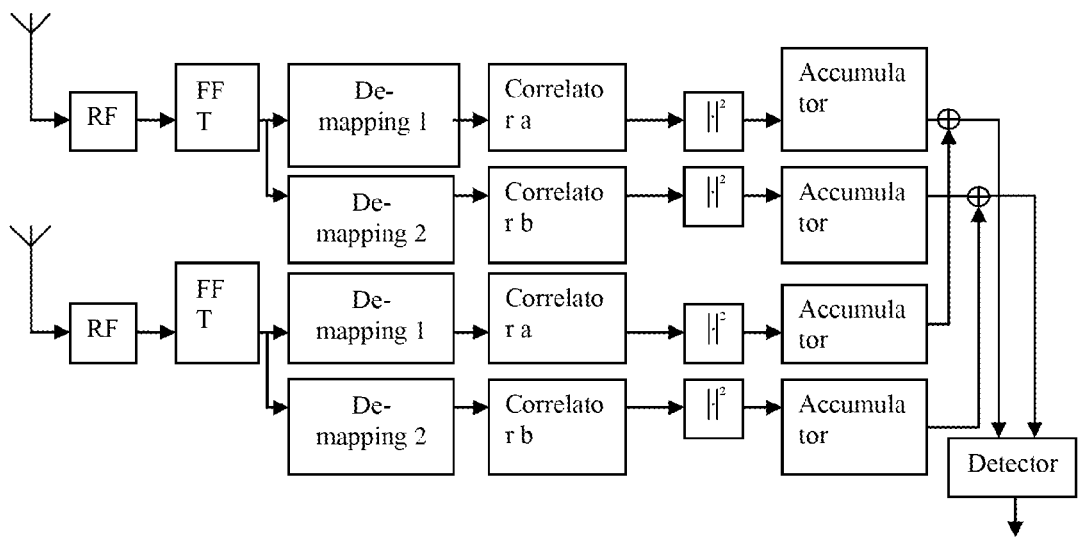
FIG. 2 shows an example of a receiver for the SSS.

A principal detector of the SSS is contained in FIG. 2 for a receiver with two receiver antennas. The output from the RF part is a sampled base-band signal. The FFT produces the frequency-domain signal and the de-mapping extracts the subcarriers corresponding to the two sets of subcarriers on which the two sequences are mapped, respectively. The set of samples used as input to the FFT is determined on the timing estimate derived from the PSS detection. A correlator is applied to generate an output, i.e., a correlation value, for each of the 31 candidate sequences. Channel estimates may be used as input to the correlator for coherent detection. The output of the correlator is squared to obtain the energy of the respective correlation value and correlation values from one or several detection attempts may be accumulated. The detector determines, for each frame timing hypothesis, which pair of sequences were received in the SSS. The cyclic prefix length can be determined by performing the same steps as in FIG. 1, but where the FFT is applied on the time-domain samples corresponding to the location of the SSS under the other cyclic prefix length configuration. This can be realized by applying a suitable time-delay on the input signal to the FFT. The cyclic prefix length could then be determined, e.g., by comparing which of the two hypotheses results in the largest correlation value for the detected output.

There are 3*168=504 cell IDs in the LTE system, which are determined by $$N_{ID}^{cell}=3N_{ID}^{(1)}+N_{ID}^{(2)}, \quad (1)$$

where $N_{ID}^{(1)}$ is a number in the range 0 to 167 detected from the SSS and $N_{ID}^{(2)}$ is a number in the range 0 to 2 detected from the PSS. Therefore, the cell ID is obtained upon correct PSS and SSS detection. The LTE standard specification contains descriptions of mapping the value $N_{ID}^{(1)}$ to indices corresponding to the two sequences transmitted in the SSS.

Once synchronization is obtained and the cell ID is known, the time-frequency location and modulation symbols of the common reference signals can be determined in order for the UE to proceed with decoding the broadcast channel, in case of initial cell search. Otherwise, it may proceed with channel quality measurements and reporting (e.g., RSRP and RSRQ) on the common reference signals.

For LTE-Advanced, the same synchronization signals as in LTE are used and all component carriers carry synchronization signals. For carrier aggregation, information concerning a configured SCell is signaled to the UE. This information includes, e.g., cell ID, carrier frequency, antenna configuration, bandwidth etc. However, it does not include any information regarding the synchronization, nor the cyclic prefix length.

Figure 3:
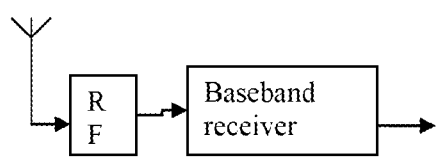
FIG. 3 provides schematic description of cell search in prior art.
Figure 4:
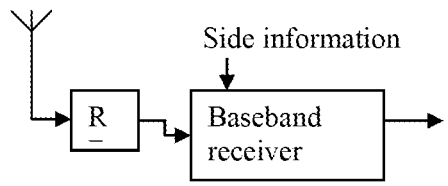
FIG. 4 provides schematic description of cell search in the disclosure.

The receivers in FIGS. 1 and 2 are only for illustrative purposes. In general, prior art solutions could be described by FIG. 3, comprising a baseband receiver, from which the output (e.g., symbol- and frame synchronization, cell ID, cyclic prefix length) is obtained. In this disclosure, side information is made available and used as an input to the receiver, as depicted in FIG. 4.

Method for a receiver of synchronization signals in a communication system utilizing carrier aggregation, where side information of configured cells is available.

The method includes usage of side information to reduce the number hypotheses in the cell search, said side information including, but not limited to information related to the cell being signaled by the system, said information comprising any of cell ID and carrier frequency of the configured cell; and information related to the cell being obtained from specified performance requirements of the cell, including any of the maximum timing alignment error among serving cells and the maximum supported channel delay spread.

The above method, where said information related to the cell is information related to a SCell and is signaled on a PCell.

The method including usage of side-information, (a) to adapt the receiver window, (b) to detect a subset of the PSSs, (c) to use cell identity as a verification in the SSS detection, (d) to detect a subset of the SSSs, and/or (e) to detect the SSS in the time-domain.

It is a problem is to obtain the synchronization of a SCell that has been configured as a serving cell for a UE capable of carrier aggregation. It has been proposed that the UE would assume that the time synchronization of another, already configured cell, could be reused as valid synchronization for the newly configured SCell. It can be assumed that the set of serving cells comprising the aggregated carriers are synchronized. However, in practical implementations, it is difficult to achieve perfect synchronization. Therefore, the LTE-Advanced standard (i.e., LTE Rel-10) specifies a maximum Timing Alignment Error (TAE) between different component carriers (i.e., TAE between serving cells). For intra-band carrier aggregation, the TAE is 0.13 μs and for inter-band carrier aggregation the TAE is 1.3 μs. A TAE of 1.3 μs would correspond to ~25% of a normal cyclic prefix length. The cyclic prefix would have to accommodate the channel delay spread, the TAE and other transmit/receive filtering impulse responses. The system performance will thus become worse, since the configured cyclic prefix length risks of becoming too small. Therefore, it would be problematic to assume the same symbol synchronization of the configured SCell as for another cell.

In this disclosure the problem of synchronizing to a SCell is mitigated by that a cell search procedure is initiated upon configuration of a SCell. However, it is important that the complexity pertaining to synchronization is minimized. It would thus be advantageous for the UE if the synchronization time could be reduced and/or less complex receivers could be utilized. From a system perspective, it would be beneficial if synchronization could be obtained at low SINRs, since the detection ability of synchronization signals determines the coverage of the cell. In particular for the heterogeneous network deployments with overlapping macro and pico cells, synchronization may need to work at SINRs much lower than for traditional homogeneous networks.

In this disclosure, it is realized that the cell search procedure can be regarded as a hypothesis test. A correctly detected hypothesis will result in OFDM symbol- and frame synchronization, the cell ID and the cyclic prefix length. The detection probability will increase if the number of tested false hypotheses can be reduced. Fewer hypotheses translate into less receiver complexity, power consumption and improved performance, which would allow cell search at lower SINRs. Hence, it is here disclosed to incorporate side information into the cell search for carrier aggregation to allow faster synchronization and lower complexity.

In the context of the LTE cell search procedure, the number of hypotheses in a 5 ms period can be described as $$H=N_{PSS} \cdot N_{sample}+N_{SSS} \cdot N_{frame} \cdot N_{CP} \quad (2)$$

where $N_{PSS}=3$ is the number of PSSs, $N_{SSS}=168$ is the number of sequence combinations in the SSSs, $N_{frame}=2$ is the number of SSSs per 10 ms radio frame, $N_{CP}=2$ is the number of cyclic prefix configurations and $N_{sample}$ is the number of input samples during 5 ms to the PSS matched filter. Since the PSS and SSS only occupy 63 subcarriers, including the DC subcarrier, it is possible to use a 64-point FFT, resulting in $N_{sample}=4800$ when the subcarrier spacing is 15 kHz. The number of hypotheses can be reduced by decreasing any of the entities on the right hand side of (2).

In the following, embodiments are described for which side information, such as cell ID, is utilized in the synchronization procedure of a configured SCell.

Utilizing Side-Information for Reducing Receiver Window

To be able to complete a cell search procedure, samples need to be processed during at least 5 ms, in order to receive at least one PSS and one SSS. In one embodiment, this period, i.e., the receiver window, is reduced utilizing the knowledge of the TAE. In a first step the UE is assuming that the synchronization of the SCell is the same as the PCell, say at sample $n_1$. Suppose the TAE corresponds to E samples. The UE, then performs cell search on a set of samples S including the set of samples $S'=\{n_1-E, \ldots, n_1+E\}$, where $S \supseteq S'$. That is, the receiver window is positioned in relation to the synchronization, $n_1$, obtained on the PCell. Thereby $N_{sample}$ can be significantly decreased. The set S contains the samples for which the correlator should produce an output. Note however, that this does not preclude the correlator for using input samples residing outside the set S.

The TAE defines a requirement at the transmitter. Even though, the SCells and PCell are aligned within the TAE, the network deployment may assume different locations of the antennas for the PCell and the SCell. For example, Remote Radio Heads (RRHs) could be considered for one of the cells. In that case, the propagation delay to the UE of the synchronization signals from the PCell and the SCell will be different. This effectively generates a larger timing misalignment in the receiver (i.e., the UE) than the TAE at the transmitter (i.e., the eNodeB). If the UE is unable to synchronize to the SCell within the receiver window, it may thus adaptively increase the set S.

Figure 5:
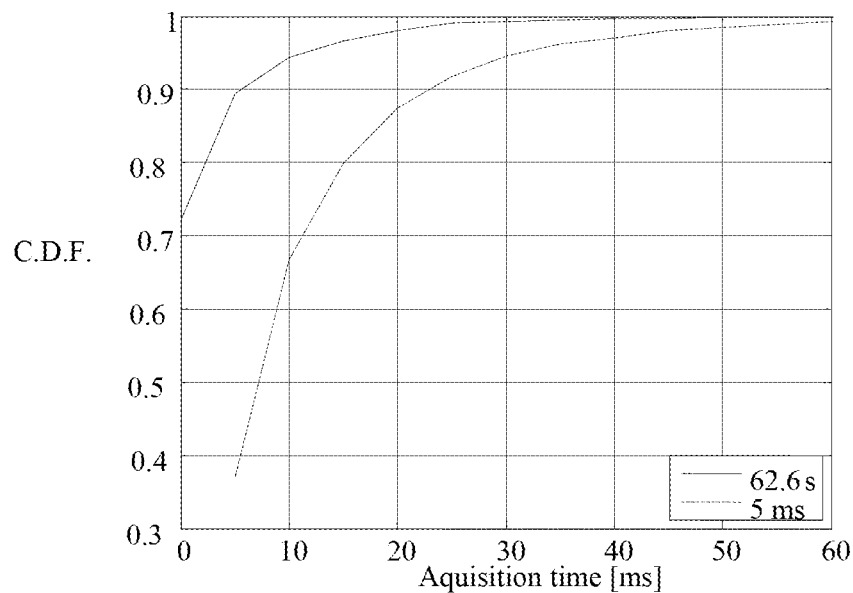
FIG. 5 shows comparison of acquisition time for two different receiver windows for the PSS.

According to the LTE standard (3GPP, Tdoc R1-111779, "LS on UE receiver window for Inter-band non-contiguous CA", Spain, Barcelona, 9-13 May 2011, which is incorporated herein by reference), the UE may have to cope with a delay spread of up to 31.3 μs among the component carriers monitored at the receiver. Thus, a minimum receiver window size can be determined given the sampling frequency used in the UE. For example, the timing on the PCell could be assumed and the receive window beginning at least 31.3 μs prior to the PCell timing and lasting at least 31.3 μs after the PCell timing may be used. That is, E should correspond to a least 31.3 μs. FIG. 5 contains results for acquisition times for detecting the PSS in a fading channel at an SNR=−12 dB. It can be seen that a large reduction in acquisition time is achieved when the receiver window is decreased from 5 ms to only 62.6 μs.

The information of the maximum TAE and maximum supported delay spread is given by the standard to which the UE must adhere. Hence, such information is pre-determined and is assumed known to the UE.

Utilizing Side-Information for PSS Detection

In one embodiment, detection is only made for a subset of the PSSs, in particular for one PSS. It is realized that given the cell ID $N_{ID}^{cell}$, it is possible to utilize (1) to uniquely determine $N_{ID}^{(1)}$ and $N_{ID}^{(2)}$. That is, for any $N_{ID}^{cell}$, there exists only one unique pair of values $N_{ID}^{(1)}$ and $N_{ID}^{(2)}$. When $N_{ID}^{(2)}$ has been determined, the correlator for the corresponding PSS is applied and $N_{PSS}=1$. It is therefore sufficient to apply only one matched filter for detecting the PSS (i.e., a subset of the PSSs is detected), reducing the number of hypotheses by $2 \cdot N_{sample}$. This will allow faster synchronization as there are fewer false hypotheses as well as less computational burden in the UE.

Figure 6:
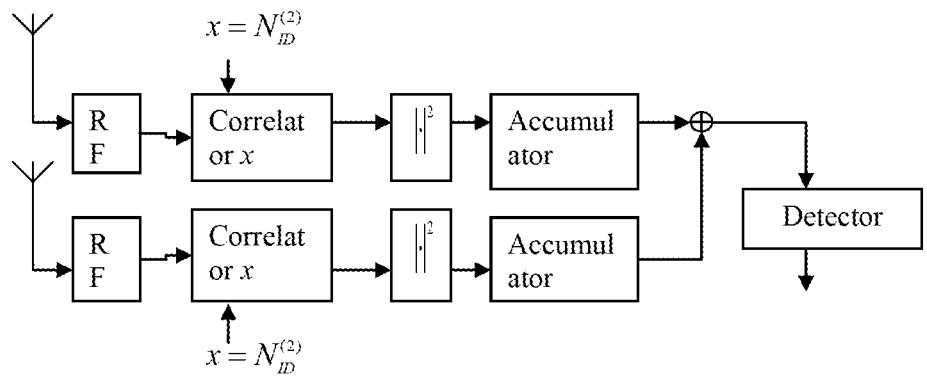
FIG. 6 provides example of a receiver for the PSS utilizing side-information.

FIG. 6 depicts an example of the PSS detector where side-information is applied.

An alternative receiver could include the 3 correlators as illustrated in FIG. 1, but only utilize the output from the correlator corresponding to $N_{ID}^{(2)}$. This would result in the same performance as for the receiver in FIG. 6. An advantage may be that no reconfiguration of the normal cell search receiver (FIG. 1) is needed, or that a separate receiver (FIG. 6) has to be implemented for carrier aggregation, while a drawback is that the number of multiplications is not reduced, since in fact the correlators would be processing the data and only the output is discarded.

Figure 7:
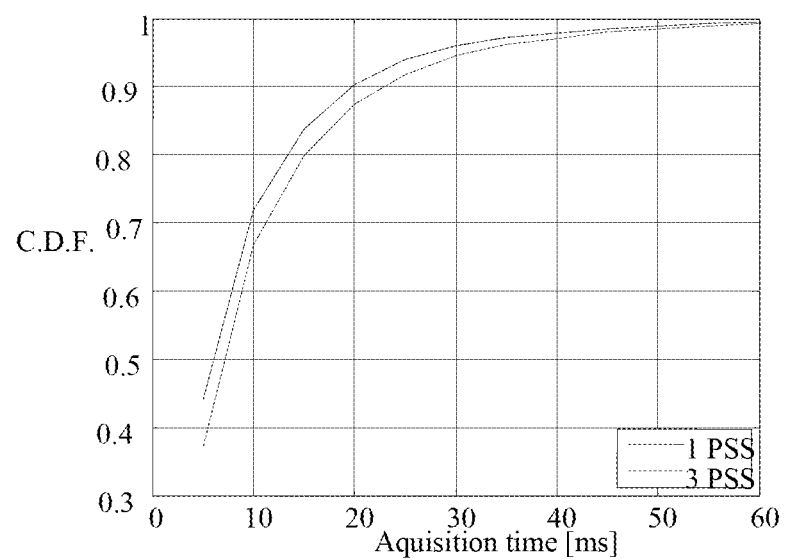
FIG. 7 shows comparison of acquisition time for 1 and 3 PSS detection, respectively.

FIG. 7 contains results for acquisition times for detecting the PSS in a fading channel at an SNR=−12 dB. The acquisition time is shortened when using correlation with only 1 PSS compared to using 3 PSSs.

Utilizing Side-Information for SSS Detection

In a further embodiment, the detection of the SSS is performed and the output $N_{ID}^{(1)}$ is used together with $N_{ID}^{(2)}$ and (1) to verify that the correct $N_{ID}^{cell}$ is obtained. In this case, the number of hypotheses is not directly reduced ($N_{SSS}=168$), however, the reliability of the SSS detection is improved by the verification of $N_{ID}^{(1)}$. Accumulation of correlation values for the detection of the radio frame timing and the cyclic prefix length may be continued until the correct cell ID can be verified. The ability to use the side information as verification therefore gives possibility for more reliable detection of the radio frame timing and the cyclic prefix. This would equivalently translate into shortened acquisition times.

In another embodiment, the detection of the SSS is performed with the side information $N_{ID}^{(1)}$. Given $N_{ID}^{(1)}$, it can be determined from (1) which sequences are transmitted in the SSSs (i.e., a subset of the SSSs is detected). This implies that $N_{SSS}=1$. It therefore only remains to detect the radio frame timing and the cyclic prefix length, requiring $N_{frame}=2$ and $N_{CP}=2$ hypotheses, respectively. By only correlating with the sequences derived from $N_{ID}^{(1)}$, the number of hypotheses is thus reduced by $167 \cdot N_{frame} \cdot N_{CP}$. The detector in FIG. 2 could perform this hypothesis reduction by utilizing the correlation values for the 2 known sequence combinations corresponding to $N_{ID}^{(1)}$. For example could the correlation values of the other sequence combinations be set to zero.

In a further embodiment, it is realized that in a system deploying carrier aggregation, the downlink carriers are synchronized. As previously explained, the synchronization is not perfect due to the TAE and the potential extra channel delay spread arising from RRH deployments. However, the synchronization error due to the TAE and the supported maximum delay spread is much smaller than 5 ms. Hence, the PSSs of the primary and secondary cells, and also the SSSs, are separated less than 5 ms for the both carriers. Hence, once correct symbol timing has been found for the secondary cell, its frame synchronization can be assumed the same (i.e., whether the first or second SSS in a subframe is received) as for the primary cell. Therefore, the receiver may use information about the frame timing in the SSS detection as a verification step outlined previously. Namely, accumulation of correlation values and the detection of the cyclic prefix length may be continued until the correct cell ID and frame timing can be verified. The ability to use the side information as verification therefore gives possibility for more reliable cyclic prefix length detection. This would equivalently translate into shortened acquisition times.

A person skilled in the art may combine the embodiments utilizing side-information both in the PSS and the SSS detection.

Detecting the SSS in the Time-Domain

In one embodiment of the disclosure, the side-information is utilized for detecting the SSS in the time-domain. This allows that OFDM symbol timing and frame timing can be detected from only one signal, i.e., the SSS. The two SSSs in a radio frame are different. It would suffice to use only one correlator (corresponding to one of the two SSS) for correct detection. That may lead to worse performance considering the accumulated useful energy would be half of that when the PSS is used, since the same PSS is transmitted two times per radio frame.

However, maximum SSS energy can be obtained by using two correlators, each corresponding to one of the SSSs. Suppose the following correlation is computed for the first SSS (p=1) and the second SSS (p=2), where r(k) is the sampled input signal, $s^*_p(k)$ is the complex-conjugate of the sampled SSS and L is the number of samples of the SSS.

$$\rho_p(n) = \left| \sum_{k=0}^{L-1} r(n+k) s_p^*(k) \right|^2 \quad (4)$$

Suppose N is the number of samples of a radio frame and for brevity, N is here assumed to be even. If $n_1$ is the correct timing of the first SSS, then $n_2=n_1+N/2$ will be the correct timing for the second SSS. Under ideal circumstances, $\rho_1(n)$ will attain its maximum for $n=n_1$ and $\rho_2(n)$ will attain its maximum for $n=n_2$. To accumulate the maximum signal energy, (4) could be processed as for $n=1, \ldots, N/2$ $$\tilde{\rho}_1(n) = \rho_1(n) + \rho_2(n+N/2),$$

$$\tilde{\rho}_2(n) = \rho_2(n) + \rho_1(n+N/2). \quad (5)$$

Detection could then be performed on $\tilde{\rho}_1(n)$ and $\tilde{\rho}_2(n)$. In particular, if the maximum correlation value $$\max_n \{\tilde{\rho}_1(n), \tilde{\rho}_2(n)\}$$

is found for $\tilde{\rho}_1(n)$, it implies that the first SSS was received at $n_1$ and the second SSS was received at $n_2$. If the maximum correlation value is found for $\tilde{\rho}_2(n)$, it implies that the first SSS was received at $n_2$ and the second SSS was received at $n_1$. Hence, the frame timing is obtained and the OFDM symbol timing (through $n_1$ and $n_2$).

Upon completion of the SSS detection, the cyclic prefix length could be found by blindly decoding the broadcast channel under either of two cyclic prefix length hypotheses. Since the physical broadcast channel (PBCH) in LTE applies a cyclic redundancy check code (CRC), it mis-detections can be determined.

The disclosure is applicable to FDD as well as TDD.

A receiver, such as a mobile terminal or a relay, may have means to perform all procedure done by a receiver as described in this disclosure.

All procedure described in this disclosure can be executed by a computer which runs proper program product. Such computer includes computer program code. Such computer program can be included in a computer program product, which also includes computer readable medium.

A person skilled in the art may also combine the time-domain detection, with the PSS detection, in order to integrate energy from two PSSs and two SSSs in a radio frame.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless transceivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of facilitating a receiver to perform synchronization to a secondary component carrier in a wireless communication system, the secondary component carrier being aggregated with a primary component carrier in the wireless communication system, the method comprising:
    obtaining side information of the secondary component carrier, wherein the side information comprises any of: a maximum timing error alignment, and a maximum channel delay spread;
    utilizing the side information to reduce occurrences of a number of synchronization hypotheses in a cell search procedure for synchronization to the secondary component carrier; and
    determining symbol timing synchronization of the secondary component carrier in accordance with the reduced occurrences of the number of the synchronization hypotheses.

2. The method of claim 1, wherein the side information is pre-determined and known to the receiver.

3. The method of claim 1, wherein the number of the synchronization hypotheses is reduced by determining a reduced length of a receiver window, the receiver window being positioned in relation to detected synchronization of the primary component carrier.

4. The method of claim 3, wherein the reduced length is determined according to any of: a maximum timing error alignment, and a maximum channel delay spread.

5. The method of claim 3, wherein the receiver window includes samples from the set $S'=\{n_1-E, \ldots, n_1+E\}$, where $n_1$ is a synchronization sample of the primary component carrier and 2E is the length of the receiver window.

6. The method of claim 1, wherein a number of the synchronization hypotheses is reduced by detecting a subset of primary synchronization signals.

7. The method of claim 1, wherein a number of the synchronization hypotheses is reduced by detecting a subset of secondary synchronization signals.

8. The method of claim 1, wherein a number of the synchronization hypotheses is reduced by applying frame synchronization detected for the primary component carrier on the secondary component carrier.

9. The method of claim 1, wherein a number of the synchronization hypotheses is reduced by detecting a secondary synchronization signal in time-domain.

10. The method of claim 9, wherein the secondary synchronization signal encodes frame timing of the secondary component carrier.

11. The method of claim 1, further comprising:
   determining a cyclic prefix length of the secondary component carrier in accordance with reduced synchronization hypotheses; and/or
   determining frame timing synchronization of the secondary component carrier in accordance with reduced synchronization hypotheses.

12. The method of claim 1, wherein a number of the synchronization hypotheses is reduced by detecting all secondary synchronization signals of a radio frame in time-domain.

13. The method of claim 1, wherein the synchronization to the secondary component carrier is performed in an initial cell search facilitating the receiver to access a cell in the wireless communication system.

14. The method of claim 13, wherein the primary component carrier and the secondary component carrier are simultaneously used by the wireless communication system for communication of the receiver in the cell.

15. A receiver capable of performing synchronization to a secondary component carrier in a wireless communication system, the secondary component carrier being aggregated with a primary component carrier in the wireless communication system, the receiver comprising:
   a non-transitory computer-readable storage medium storing a program; and
   at least one processor for executing the program, the program storing instructions to:
      obtain side information of the secondary component carrier, wherein the side information comprises any of: a maximum timing error alignment, and a maximum channel delay spread;
      utilize the side information to reduce occurrences of a number of synchronization hypotheses in a cell search procedure for synchronization to the secondary component carrier is performed; and
      determine symbol timing synchronization of the secondary component carrier in accordance with the reduced occurrences of the number of synchronization hypotheses.

16. An apparatus for facilitating a receiver to perform synchronization to a secondary component carrier in a wireless communication system, the secondary component carrier being aggregated with a primary component carrier in the wireless communication system, the apparatus comprising:
   a non-transitory computer-readable storage medium storing a program; and
   at least one processor for executing the program, the program storing instructions to:
      obtain side information of the secondary component carrier, wherein the side information comprises any of: a maximum timing error alignment, and a maximum channel delay spread;
      utilize the side information to reduce occurrences of a number of synchronization hypotheses in a cell search procedure for synchronization to the secondary component carrier is performed; and
      determine symbol timing synchronization of the secondary component carrier in accordance with the reduced occurrences of the number of synchronization hypotheses.

* * * * *